United States Patent [19]

Kaul et al.

[11] 4,274,780
[45] Jun. 23, 1981

[54] APPARATUS FOR STACKING LAYERS OF OBJECTS

[75] Inventors: Günther Kaul; Wilfried Grünert; Wilhelm Aufenvenne, all of Beckum, Fed. Rep. of Germany

[73] Assignee: Möllers Maschinenfabrik GmbH, Beckum, Fed. Rep. of Germany

[21] Appl. No.: 56,733

[22] Filed: Jul. 11, 1979

[30] Foreign Application Priority Data

Jul. 19, 1978 [DE] Fed. Rep. of Germany ....... 2831621

[51] Int. Cl.³ ............................................. B65G 57/24
[52] U.S. Cl. ..................................... 414/64; 198/457; 198/784; 414/68; 414/83; 414/903
[58] Field of Search ....................... 414/57, 62, 64, 68, 414/83, 903, 907; 198/457, 784, 781

[56] References Cited

U.S. PATENT DOCUMENTS

| 2,699,264 | 1/1955 | Bruce et al. | 414/62 X |
| 3,130,839 | 4/1964 | Grasvoll | 414/83 |
| 3,402,830 | 9/1968 | Copping et al. | 414/83 |
| 3,756,427 | 9/1973 | Arnemann | 414/903 X |
| 3,986,621 | 10/1976 | Bowser | 414/101 X |
| 4,000,820 | 1/1977 | Kurk et al. | 414/64 X |
| 4,006,815 | 2/1977 | Werntz | 198/784 |
| 4,022,334 | 5/1977 | Lässig | 414/64 X |
| 4,024,965 | 5/1977 | Marth et al. | 414/64 X |
| 4,058,225 | 11/1977 | Janson | 414/57 |

FOREIGN PATENT DOCUMENTS

| 2414983 | 10/1974 | Fed. Rep. of Germany | 198/784 |
| 2325518 | 11/1974 | Fed. Rep. of Germany | 198/784 |
| 52-49575 | 4/1977 | Japan | 414/903 |

Primary Examiner—Leslie J. Paperner

[57] ABSTRACT

Objects to be stacked on a pallet or packaged without using a pallet, are transported by a conveyor to an inlet roll track where the objects are assembled into rows, from the inlet roll track a row of the objects is transferred to an intermediate support member where a layer of rows of the objects are collected and then picked up by a forklift device for movement to a pallet or a stack support. The inlet roll track is made up of a number of rollers which can be driven at variable speeds with the rollers most remote from the inlet to the inlet roll track moving at the lowest speed. Alternatively, the rollers of the inlet roll track can be arranged in groups with each group operating at a different speed and capable of being switched on and off separate from the other groups. The stack support can be moved vertically so that the forklift device places each layer on it in about the same horizontal plane as the stack is built up.

12 Claims, 11 Drawing Figures

APPARATUS FOR STACKING LAYERS OF OBJECTS

SUMMARY OF THE INVENTION

The present invention is directed to an apparatus for stacking objects in layers on a loading pallet or on a stack support surface and includes an inlet roll track with an abutment member which acts as a stop as the objects are moved onto the track. From the track, the objects are moved in rows to an intermediate support member formed of a plurality of laterally spaced fixed supporting rails on which the rows of objects are assembled into a layer. A forklift device movable in a closed orbit picks up each layer from the intermediate station, moves it over a stack support member and then lowers the layer onto the stack with the forklift device being withdrawn between vertically extending strippers.

In known apparatus of this type, such as disclosed in U.S. Pat. No. 3,130,839, it has been found that, in view of the type of objects being stacked, such as sacks or bags containing relatively light granulated plastic, there is a tendency for the objects to become deformed at critical locations in the apparatus. Such deformation is very detrimental to the stability of the stacks to be formed, especially for stacks extending to a height of about 2.50 m or where the objects are packaged without using a pallet. An especially critical location in the apparatus is adjacent the abutment member at the end of the inlet roll track both because of the possible deformation of the objects as they are moved onto the inlet roll track and also regarding the subsequent transfer of rows of the objects from the track to the intermediate support member. In the past, the first of a row moving onto the inlet roll track tends to become twisted causing the entire row of bags to be misaligned. Further, the difficulties experienced in the past are increased when the need for higher throughputs of the objects is required.

Therefore, it is the primary object of the invention to provide an apparatus which ensures the possibility of increased throughput of the objects while providing specially handling so that uniform and stable stacks of the objects can be produced.

In accordance with the present invention, the rollers making up the inlet roll track are driven at different speeds, that is, the rollers closer to the abutment member at the end of the track operate at a slower speed compared to the rollers at the entrance onto the track. After a row of objects has been completed on the track and before the row is transferred, the abutment member can be moved away from the object contacting it so that the row of objects can be moved onto the intermediate support member without any interference which would tend to misalign the row. At the stack support member which receives a layer of objects from the intermediate support member, an empty loading pallet can initially be positioned at the highest position and then gradually lowered as the height of the stack increases.

In accordance with this arrangement, even at substantially high throughputs and, accordingly, an increased speed rate over the inlet roll track, the individual objects are decelerated at the downstream end of the inlet roll track so that deformation of the object as it contacts the abutment member does not occur. Moreover, though higher speeds of transfer from the inlet roll track to the intermediate support member may be used, there is no dislocation of the row of objects occurring because one of the objects is in contact with the abutment member, since the abutment member has been moved laterally out of the path of movement of the object. The time required for decelerating the objects moving into the inlet roll track and for displacing the abutment member is more than compensated by the time required for moving a finished layer of objects from the intermediate support member, since only a short vertical movement is required. When the layer of objects is placed on or over the stack support member, the layer is stripped from a forklift device by the upper ends of vertical strippers which separate the intermediate support member from the stack support member. Since the movement from the intermediate support member to the stack support member always requires the same amount of time, all of the other movements involved in the apparatus remain the same.

The rollers of the inlet roll track can be divided into a number of groups with the rollers in each group driven at the same speed. Further, the individual drives for each group of rollers can be switched on and off separately. Moreover, it is also possible that the last group of rollers adjacent the abutment member are not driven at all. The division of the rollers into individual groups and the selection of the speeds and the time during which the rollers are driven and stopped can be varied as a function of the type of objects being transported. In one particularly simple form, the driven rollers can be of equal diameter along the inlet roll track with the members on the rollers which are driven, for instance by a common endless drive member, such as a chain, a V-belt or the like, having increasing diameters in the direction toward the abutment member at the downstream end of the track.

Another feature of the invention is the provision of the rollers at the entrance to the roll track with friction-increasing surfaces for maintaining the initial feed rate of the objects as high as possible, even when the objects must be accelerated from a standstill, that is when they are moved from a stationary position on the preceding synchronization belt.

Furthermore, it might be advisable to provide the rollers adjacent the abutment member with an outer sleeve which can be rotated relative to a driven core so that objects piled up against one another with the rollers still driven can rest on such outer sleeves without being rotated. Such an arrangement further contributes to the gentle treatment of the objects as they are moved through the apparatus.

After a row of objects has been formed on the inlet roll track, the abutment member located at the downstream end of the track can be pivoted using a simple structure such as drivable parallelogram links. The abutment member is displaced or pivoted to the extent that subsequent transfer of a formed row of objects does not affect the alignment of the objects in the row.

Upstream of the inlet roll track a transport system is used for supplying the objects to the track. Such a system usually includes a turning lug for rotating the objects by 90° for providing rows of objects with the long sides oriented transverse to the normal direction of travel. For operation at higher throughputs, a turning accelerator can be associated with the turning lug and designed preferably as a vane wheel rotatably mounted in the vicinity of the turning lug. The vane wheel can be driven at increasing speed in the operative segment region of each vane so that each vane helps to rotate the rear portion of an object toward the front whereby the stress on the object is reduced during the rotating operation. With such an arrangement an approximately equal force is exerted on both ends of the object during rotation.

To facilitate the removal of the objects from the forklift device by the stripper or to reduce the stress on the objects during such removal, the forklift device can be formed of a hollow connecting member from which a plurality of forklift arms extend so that compressed air introduced into the connecting beam can issue through openings in the arms in the plane located in juxtaposition to the bottoms of the objects.

Moreover, at least the central arms of the forklift device can be provided with upper guide ledges so that with the objects arranged in a "chimney bond" rotation of the bags in the region of the free ends of the arms does not occur when the forklift device is pulled back from the stack support member.

Finally, the transport system which supplies the objects one at a time to the inlet roll track can be provided with at least one transport element, such as a so-called synchronization belt, which can be switched on and off separately from the remainder of the transport system. Accordingly, objects not supplied with the desired exact timing at high feed velocities from the preceding portions of the transport system and treatment elements, can be introduced onto the inlet roll track very exactly in synchronization with the track. Based on the magnitude of the desired throughput, one or two such synchronization belts or transport elements can be provided and switched on and off separately.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
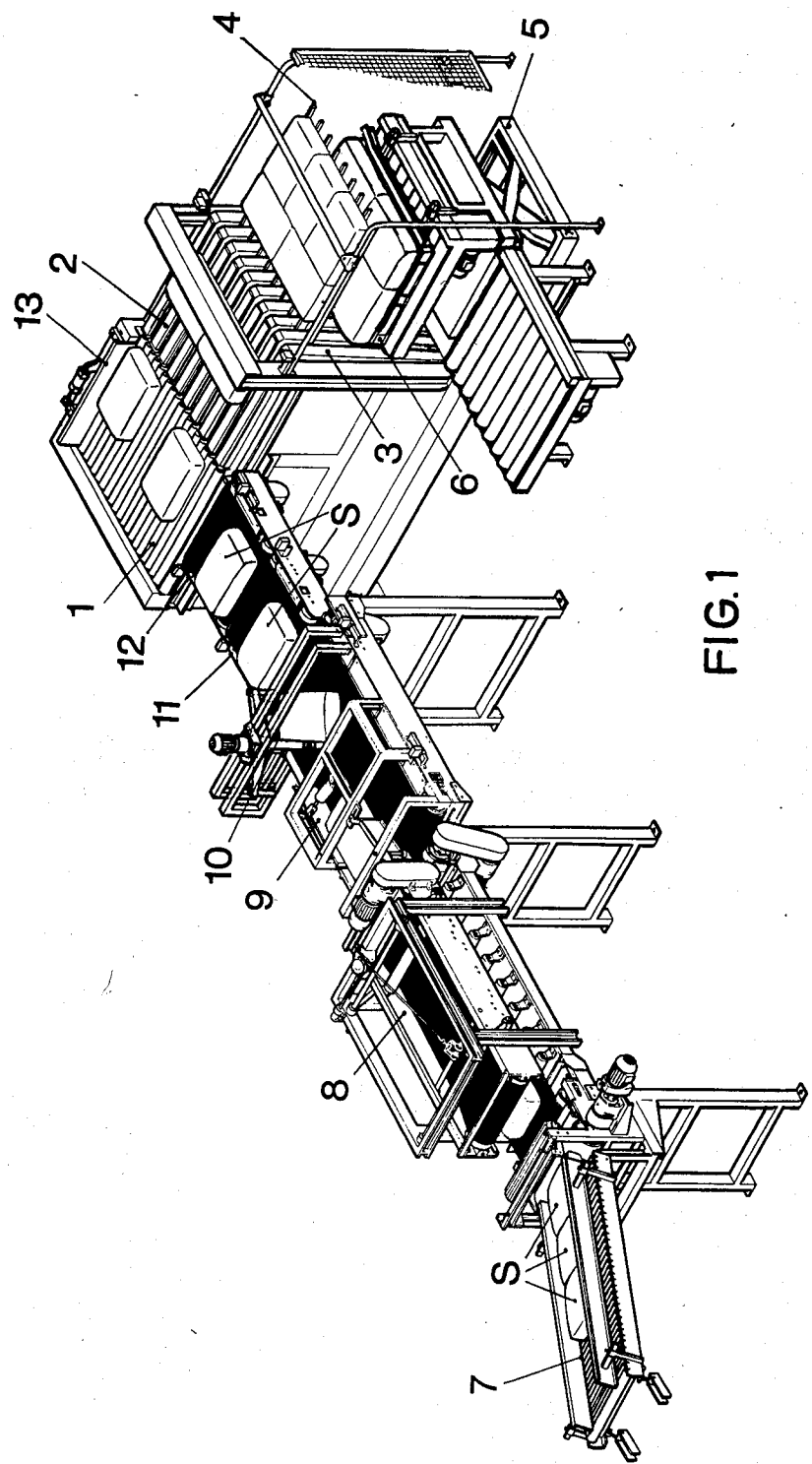
FIG. 1 is a perspective view of the overall apparatus embodying the present invention.

In FIG. 1 the portion of the apparatus which forms and stacks the layers of objects consists of an inlet roll track 1, an intermediate support member 2, vertical strippers 3, and a forklift device 4 movable between the intermediate support member and a lift device 5 on which a loading pallet 6 is positioned. The lift device 5 forms a stack support member which can also be used for packaging the objects without using a supporting pallet. Though not shown in detail, a transfer member is located at the inlet roll track 1 for moving a row of objects formed on the track 1 onto the intermediate support member 2. The transfer member, in the form of prongs or arms, can be raised between the individual rollers of the track 1 for lifting a row of objects and moving them onto the intermediate support member 2.

In the illustrated embodiment of the invention, the objects being stacked are shown as bags S, delivered more or less continuously, one after the other, from a bag-filling system, not shown, to the inlet roll track 1.

From the bag-filling system, the bags S are delivered onto the inlet roll track over a conveying system consisting of a back-up roll track 7, a bag smoothing device 8, a side shifter 9, that is a so-called pusher, a bag turning device 10, and two successively arranged synchronization belts 11, 12 which lead to the entrance to the inlet roll track.

As is substantially known, the conveying system operates in the following manner: individual bags S from the bag-filling system are supplied onto the back-up roll track 7 and from this track are introduced into the bag smoothing device 8 at a predetermined rated via a proportioning device located at the downstream end of the back-up roll track 7, that is the end adjacent the bag smoothing device. The bag smoothing device 8 is formed by two conveyor belts between which the individual bags S pass. In effect, the bags are shaped in a uniform manner as they pass between the conveyor belts so that uniform stacks can be subsequently formed. Next, the side shifter or pusher 9 displaces certain bags laterally across the conveying surface in accordance with the orientation of the bags in the row to be formed on the inlet roll track. As viewed in FIG. 1, a turning device 10 follows the pusher 9 for rotating individual bags through 90°. In other words, depending on the location of the bag as it moves from the side shifter 9, its position may be changed so that its long dimension extends transversely of the conveying surface toward the inlet roll track instead of parallel with it which is the direction of the long side as the bags S enter onto the back-up roll track 7.

Next, the bags S move onto the serially arranged synchronization belts 11, 12 where the bags are stopped for a brief time prior to being introduced onto the inlet roll track 1 at precisely the exact time.

From the synchronization belts, the bags are moved, one after the other, onto the inlet roll track 1 to form a row extending from the abutment member 13 toward the entrance side of the inlet roll track. The leading bag in each row contacts the abutment member 13 and the following bags abut one another. When a row of bags has been assembled on the inlet roll track 1, a transfer member, not shown, lifts the row and moves it onto the intermediate support member 2 which is formed by a plurality of stationary support rails extending in the same general direction as the rollers of the inlet roll track. A complete layer of the bags consisting of two or more rows of the bags, is assembled on the intermediate support member. In FIG. 1, above the stack support member or lift device 5, a complete layer can be seen formed of two rows. In one row the long side of the bags extend parallel with the rollers in the inlet roll track and in the other row the long sides of the bags extend transversely of the rollers. When a complete layer is formed on the intermediate support member 2, it is lifted by an arm or prong type forklift device 4 moved forwardly of the vertical strippers 3 and then lowered onto the loading pallet 6 which is located at the highest position of the lift device 5 if it is empty. By withdrawing the forklift device 4 back toward the intermediate support member between the vertical strippers 3, the layer of bags is stripped from the device and placed as the top layer on the stack. As the height of the stack increases, the lift device 5 is lowered, in a stepwise manner, so that each layer is placed on the stack in approximately the same horizontal plane.

The parts of the apparatus embodying the present invention will now be explained.

Figure 2:
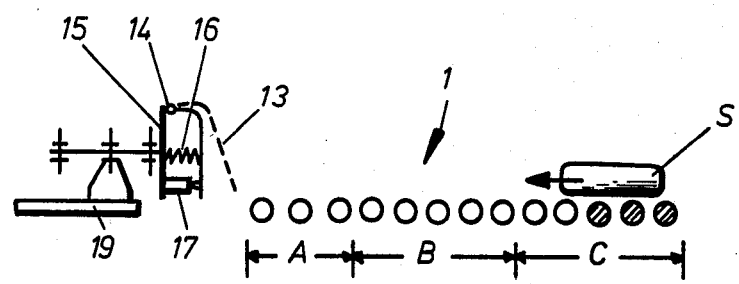
FIG. 2 is a schematic side view of the inlet roll track including an abutment member in accordance with the present invention.

As shown in FIG. 2, the rollers in the inlet roll track 1 are divided into three groups A, B and C. Group A is located adjacent the abutment 13 and may not be driven, the other two groups B and C are driven at different speeds at different times.

The group C is located at the entrance end of the inlet roll track where the bags move from the synchronization belts onto the track.

Several of the first rollers in Group C, note the cross hatched rollers, have a friction-increasing exterior surface, that is the exterior surface may be rubberized, so that the initial movement of the bags S entering onto the inlet roll track 1 from the adjacent synchronization belt 12 occurs very rapidly. Subsequently, the speed at which the individual bags travel is reduced in the region of the roller group B with a further reduction in the region of the roller group A, which nay not be driven. The division of the rollers into the groups A, B and C is effected depending on the nature of the bags being transported. Furthermore, the speed, the drive and the stoppage times of the individual roller groups can be changed as a function of the nature of the bags.

Except for the first rollers at the entrance end of the inlet roller track which are provided with friction-increasing surfaces, all of the other rollers may be provided with a drive core and an outer sleeve rotatable with the core by a certain friction lock. With such an arrangement, when the bags come to a stop, the individual rollers can continue to run for a brief period without deforming the bags.

Alternatively, a reduction in the speed of the inlet rollers conveying the bags toward the abutment member 13, can be provided with all of the rollers driven by a common drive chain or belt controllable with respect to its speed. Each of the individual rollers has a drive pinion or pulley in drive connection with the drive chain or belt. The diameters of the drive pinions or pulleys can be increased in the direction toward the abutment ledge for affording the desired variable speed characteristic of the rollers. As mentioned above, in such an arrangement it would also be possible that the group of rollers next to the abutment member 13 are not driven.

As shown in FIG. 2, the abutment member 13 is formed of an angle plate pivotally mounted on an upper horizontal axis 14. A vertical support plate 15 depends downwardly from the axis 14 and a compression spring 16 extends between the support plate 15 and the angle plate providing a spring support for the abutment member 13 when a bag contacts it. In addition, a limit switch 17 is located between the support plate 5 and the pivotal angle plate of the abutment member 13 and the compression spring 16 is connected with photo-cells, not shown, and positioned above the inlet roll track. The compression spring is rated so that the limit switch 17 controls the groups of rollers B and C and slowly reduces the speed of the bags until the reduction in the speed of the inlet rollers reaches zero. As a result, deformation of the bags is avoided as they move onto the inlet roll track with the lead bag contacting the abutment member.

The support plate 15 is mounted on parallelogram links 18, in turn, supported on a base plate 19. A pneumatic or hydraulic piston-cylinder unit 20 is connected at one end to one of the links 18 and at its other end it is pivotally mounted on the base plate 19.

Figure 3:
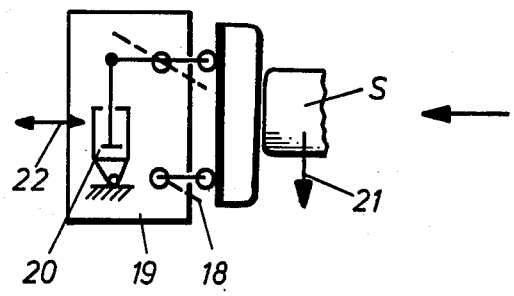
FIG. 3 is a plan view of the downstream end of the roll track as shown in FIG. 2.
Figure 4:
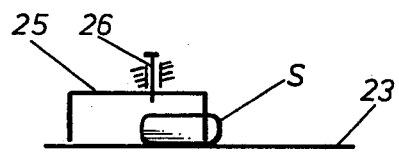
FIG. 4 is a schematic side view of a turning accelerator used in the apparatus embodying the present invention.

When a complete row of bags has been assembled on the inlet roll track, with this pivotal support of the plate 15 the abutment member 13 can be pivoted away from the bag which contacts it, note FIG. 3 where a part of the pivotal displacement is indicated in dashed lines, so that the assembled row of bags can be transferred to the intermediate station 2 without any danger that the bag located next to the abutment ledge is rotated out of position. In FIG. 3, arrow 21 indicates the direction of the movement of the row from the inlet roll track 1 to the intermediate support member 2. By moving the abutment member 13 laterally away from the adjacent bag S displacement of the bag is avoided.

Base plate 19 is displaceable in the direction of the arrow 22, note FIG. 3, by means of a mechanism, not shown, for varying the position of a row of bags relative to a preceding row. For example, when so-called palletless packaging is being performed, a special layer with laterally recessed areas for the engagement of the forklift prongs, can be formed.

Figure 5:
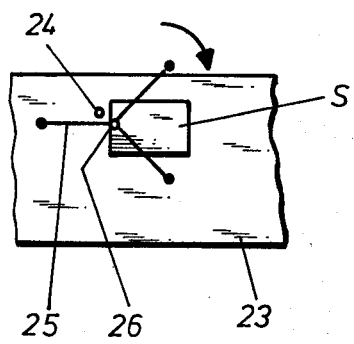
FIG. 5 is a plan view of the apparatus shown in FIG. 4.
Figure 7:
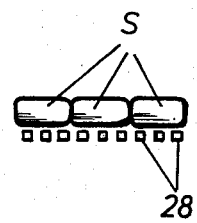
FIG. 7 is a front view of the forklift device illustrated in FIG. 6.

In the region of the turning device 10 along the conveying system leading up to the inlet roll track 1, a turning lug 24 is positioned above a conveyor belt 23 and is located in the path of a bag moving over the belt. When a corner of a bag S contacts the turning lug 24 as it is conveyed by the belt 23, it is rotated through 90° due to the movement of the belt. To accelerate this movement, a turning accelerator 25, in the form of a vane wheel, is mounted for rotation about a vertical axis located adjacent the turning lug, note FIG. 5. The vane wheel is dimensioned and driven so that its individual vane arms contact a bag adjacent its trailing end when one of its leading corners contacts the turning lug 24 and increasingly accelerates the rotation of the bag through 90°. The combination of the turning lug and the turning accelerator provide particularly gentle treatment of the bags due to the uniform application force at both ends of the bag.

Figure 6:
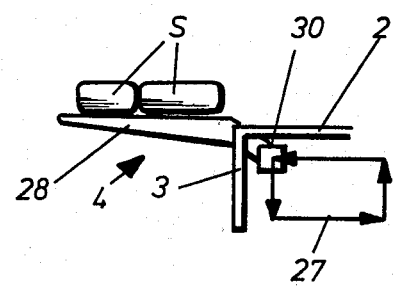
FIG. 6 is a side view of the forklift device used in the apparatus embodying the present invention.

As illustrated schematically in FIG. 6, the arm or prong type forklift device 4 is movable in a schematically indicated closed and substantially rectangular orbit 27. In use, the individual prongs 28 of the forklift device 4 are lifted upwardly, moving between the fixed support rails of the intermediate support member 2 and providing a lifting support for a completed layer of bags. After being lifted upwardly so that the layer of bags clears the vertical strippers 3, the prongs are moved forwardly until the layer is located above the loading pallet 6 and then the prongs are lowered for displacing the layer onto the pallet or onto a previously stacked layer. Next, the forklift device is pulled back so that the prongs 28 pass between the vertical strippers 3 displacing the layer onto the stack with the forklift device returning into its starting position for a new cycle. As compared to a previously known arrangement, in which the forklift device had to be moved vertically so that it could deposit the layer on the loading pallet in its lowest position, in this arrangement the vertical movement of the device is kept very small. Limiting the vertical movement affords a considerable savings in time which can be used at other locations of the apparatus for the protective handling of the bags, especially in the deceleration of the bag being moved onto the inlet roll track, as discussed above.

Figure 8:
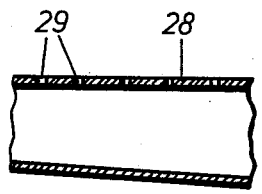
FIG. 8 is a partial longitudinal sectional view through an arm of the forklift device shown in FIGS. 6 and 7 with the arm illustrated on a larger scale.
Figure 9:
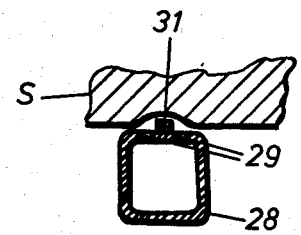
FIG. 9 is a vertical cross section of an arm of the forklift device shown in FIGS. 6 and 7 with the arm shown on a larger scale.

As illustrated in FIGS. 8 and 9, each prong 28 of the forklift device is hollow and is provided with openings 29 through its upper surface. The prongs are cantilevered outwardly from a transversely extending hollow connecting beam 30. Compressed air supplied into the beam 30 flows into the individual prongs 28 and escapes to the openings 29 facilitating a gentle removal of the layer of bags from the prongs. Due to the use of compressed air, the displacement of the layer of bags can be greatly accelerated.

Figure 10:
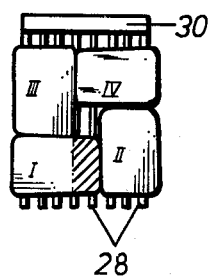
FIG. 10 is a plan view of the forklift device displayed in FIGS. 6 and 7 with a layer of bags arranged in a so-called four-member chimney bond.

At least the prongs 28, extending from the mid-portion of the beam 30, are provided with guide ledges 31, rounded at the top, note FIG. 9, to prevent any displacement of bags when they are arranged in a so-called four-member chimney bond as shown in FIG. 10. With the use of the guide ledges 31, when the bag I, shown in FIG. 10 located at the free ends of the prongs 28 with its long sides extending transversely of the direction in which the forklift device is moved is displaced with the rest of the chimney bond layer, the portion of the bag I shown crosshatched will not be displaced into the central open space formed in the layer. Accordingly, the shape of the bag layer will be retained when it is set down on the loading pallet or on a bag layer previously positioned on the pallet.

Figure 11:
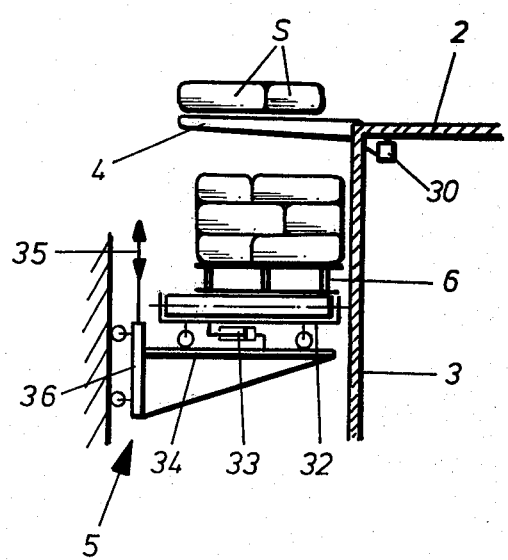
FIG. 11 is a schematic side view of the lift device for the loading pallet.

In FIG. 11, the loading pallet 6 is shown resting on a drivable transport roll track 32 which is movable back and forth on rails 44 by a pneumatically or hydraulically driven piston-cylinder unit 33. The rails are supported on a lift carriage 36 which is movable vertically in the direction of the double headed arrow 35.

In operation, the carriage 36 along with the roll track 32 and an empty loading pallet 6 is lifted into its highest position so that a first layer of bags S can be set down by the forklift device 4 in the manner described above. After the first layer of bags is deposited on the pallet 6 the lift carriage 36 is moved downwardly by the height of one layer of bags and the next layer can be placed on the pallet commencing the stack. The horizontal plane on which each subsequent layer of bags is deposited remains the same, the lift carriage 36 providing the necessary vertical movement of the stack being formed. This downward movement of the carriage 36 continues until the stack of layers is completed. The movement of the track 32 along the rails 34 permits the stack to be moved away from the strippers after each layer is set down so that any rebound that may have occurred in the region of the strippers during the removal operation, is eliminated. This feature affords a perfectly uniform bag position (or layer), and it is possible to compensate in a known manner for any slight displacement which might occur and any slight lateral overhang caused by the slight inclination of the upper ends of the strippers toward the stack of bags.

The synchronization belts 11 and 12, not specifically illustrated in detail, stop each bag, if necessary, for a short time (a fraction of a second) and then introduce the bag onto the inlet roll track at an exact rate or rhythm. All parts of the apparatus following the inlet roll track operate very precisely in rhythm with the individual movements again involving only fractions of a second. For an apparatus with a medium output, one synchronization belt may be sufficient. For an apparatus with a high throughput of up to 2600 bags per hour, two synchronization belts are required for reliably avoiding any displacement of the position of the bags relative to one another before being moved onto the inlet roll track.

Naturally, the described embodiment can be varied in a number of ways without departing from the basic inventive concept. For example, the downward movement of the lift carriage 36 can be effected in larger steps than correspond to the height of an individual layer of bags and, as a result, it would be necessary to increase the vertical movement of the forklift device correspondingly. Instead of the vane wheel, another form of turning accelerator could be employed, for example, a single reciprocating pivot arm contacting the rear corner of an oncoming bag. The drive for the forklift device 4 can be arranged, because of the relatively small vertical movement involved, in a much simpler design than the presently known construction where the device must be capable of moving vertically for the full height of the stack being formed. Accordingly, instead of a horizontally movable carriage with a vertical guide scaffold for the forklift device, a stationary coupling cam drive could be used or instead a simpler horizontally movable carriage could be employed with circulatory movable parallel links articulated to it and supporting the forklift. The feeding of the empty loading pallets can take place with the transport roll track in the upper position on the lift carriage. Furthermore, the entire apparatus can be used without loading pallets for so-called palletless packaging, that is forming a stack enveloped on all sides within a shrinkable foil envelope with recesses formed for engaging lift elements so that the stack can be formed directly on the stack support member or transport roll track 32. Furthermore, a back-up roll track might be used in place of the illustrated synchronization belts 11, 12.

While specific embodiments of the invention have been shown and described in detail to illustrate the application of the inventive principles, it will be understood that the invention may be embodied otherwise without departing from such principles.

What is claimed is:

1. Apparatus for stacking objects such as bags of material, on a loading surface comprising means for conveying the objects one after another from a supply source, an inlet roll track arranged to receive the objects from said conveying means and including an abutment member acting as a stop for the objects moving onto the inlet roll track, an intermediate support member including laterally spaced fixed supporting elements arranged to receive rows of the objects from said inlet roll track for assembling the rows into a layer, a stack support member for receiving a stack of layers of the objects from said intermediate support member, vertical stripping members located between said intermediate support member and stack support member, and a forklift means movable in a closed path for lifting a layer of objects from said intermediate support member, for moving the layer over said stack support member, for lowering the layer toward said stack support member and for returning into position for lifting another layer from said intermediate support member, wherein the improvement comprises that said inlet roll track comprises a plurality of rollers extending transversely of the direction of movement of said conveying means, said abutment member extending in the same general direction as said rollers and spaced from said conveying means, said rollers being driven at a speed decreasing in the direction toward said abutment member, said abutment member being displaceable away from the objects arriving on said rollers from said conveying means for facilitating the movement of a row of the objects on said inlet roll track to said intermediate support member, and said stack support member being vertically movable for receiving individual layers of the objects in approximately the same horizontal plane during progressive formation of a stack on said stack support member.

2. Apparatus, as set forth in claim 1, wherein said rollers are divided into a number of groups of said rollers with one said group following the other between said conveying means and said abutment member and each said group of rollers being separately driven and being switched on and off separately.

3. Apparatus for stacking objects, as set forth in claim 1, wherein said rollers are divided into a number of groups with one group following the other between said conveying means and said abutment member, and said rollers in said group closest to said conveying means having friction-increasing surfaces for contacting the objects moving from said conveying means onto said inlet roll track.

4. Apparatus for stacking objects, as set forth in claim 1, wherein a parallelogram linkage member supports said abutment member, a drive means connected to said linkage member for displacing said abutment member in the direction away from said conveying means so that said abutment member is displaced out of contact with the adjacent object in the row formed on said inlet roll track as it is moved to said intermediate support member.

5. Apparatus for stacking objects, as set forth in claim 1, wherein said conveying means comprises a turning lug located in the path of the objects traveling over said conveying means to said inlet roll track, said turning lug arranged to contact and turn the objects through 90° as they pass over said conveying means, and a turning accelerator located in the path of the objects traveling over said conveying means for acting in cooperation with said turning lug for turning the objects through 90°.

6. Apparatus for stacking objects, as set forth in claim 5, wherein said turning accelerator is a rotatable vane wheel with the vanes thereon rotatable in a circular path traveling around said turning lug, said turning accelerator being drivable at increasing speeds for facilitating the turning action of the objects.

7. Apparatus for stacking objects, as set forth in claim 1, wherein said forklift means comprises a hollow connecting beam extending transversely of the direction of movement of the objects from said intermediate support member to said stack support member, a plurality of hollow prongs spaced laterally apart on and extending outwardly from said hollow connecting beam in the direction of movement of the object from said intermediate support member to stack support member, said prongs arranged to lift the objects from said intermediate support member and having openings therefrom in the surface thereof supporting the objects so that compressed air introduced into said connecting beam flows into said prongs and out of the openings therein directed toward the objects supported on said prongs.

8. Apparatus for stacking objects, as set forth in claim 1, wherein said forklift means comprises a connecting beam extending transversely of the direction of movement of the objects from said intermediate support member to said stack support member, a plurality of prongs spaced laterally apart on and extending outwardly from said connecting beam in the direction of movement of the object from said intermediate support member to said stack support member, at least said prongs located centrally on said connecting beam having a guide ledge extending from said prong in the direction toward the objects to be supported on said prongs.

9. Apparatus for stacking objects, as set forth in claim 1, wherein said conveying means comprise at least one conveyor located adjacent to said inlet roller track for conveying objects to said inlet roller track, said conveyor being individually controlled for switching said conveyor on and off separately from the control of the remainder of the apparatus.

10. Apparatus for stacking objects, as set forth in claim 1, wherein said conveying means comprises means for uniformly shaping each of said objects as said objects are transported from the supply source to said inlet roll track.

11. Apparatus for stacking objects, as set forth in claim 1, wherein said conveying means includes shifting means for displacing the objects laterally as they are transported over said conveying means to said inlet roll track.

12. Apparatus for stacking objects, as set forth in claim 1, wherein said stack support member comprises a vertically movable carriage movable over a vertical dimension corresponding to the height of the stack of objects to be formed; means on said movable carriage arranged to be moved in the horizontal direction in the direction extending from said intermediate support member to said stack support member so that said stack can be uniformly formed without adverse contact with said vertical stripping member.

* * * * *